United States Patent [19]

Pagen et al.

[11] Patent Number: 4,588,634

[45] Date of Patent: May 13, 1986

[54] COATING FORMULATION FOR INORGANIC FIBER MAT BASED BITUMINOUS ROOFING SHINGLES

[75] Inventors: Charles A. Pagen, Hurst, Tex.; George Stepien, Jr., Montclair, N.J.; Paul A. Morris, Bedford, Tex.

[73] Assignee: The Flintkote Company, Stamford, Conn.

[21] Appl. No.: 690,370

[22] Filed: Jan. 9, 1985

Related U.S. Application Data

[62] Division of Ser. No. 520,844, Aug. 5, 1983, abandoned.

[51] Int. Cl.$^4$ .................. B32B 5/16; D04H 1/08; B05D 3/02; G08K 7/14
[52] U.S. Cl. .................. 428/283; 428/281; 428/291; 427/389.8; 524/68; 524/71
[58] Field of Search .................. 428/283, 291, 281; 524/68, 71; 427/389.8

[56] References Cited

U.S. PATENT DOCUMENTS

| | | | |
|---|---|---|---|
| 3,015,582 | 1/1962 | Simison | 162/145 |
| 3,096,196 | 7/1963 | Bettoli et al. | 428/143 |
| 3,207,619 | 9/1965 | Klimboff | 428/144 |
| 3,305,509 | 2/1967 | Waterman et al. | 428/63 |
| 3,338,849 | 8/1967 | Johnson | 524/68 |
| 3,404,108 | 10/1968 | Regenstein et al. | 524/423 |
| 3,547,674 | 12/1970 | Draper et al. | 428/284 |
| 3,900,102 | 8/1975 | Hurst | 206/411 |
| 3,930,100 | 12/1975 | McDonald | 428/323 |
| 3,931,440 | 1/1976 | Shepherd et al. | 428/281 |
| 3,937,640 | 2/1976 | Tajima et al. | 156/71 |
| 3,952,137 | 4/1976 | Tuder | 524/68 |
| 4,032,491 | 6/1977 | Schoenke | 524/68 |
| 4,039,706 | 8/1977 | Tajima et al. | 428/40 |
| 4,055,453 | 10/1977 | Tajima et al. | 156/279 |
| 4,097,644 | 6/1978 | Evensen et al. | 428/281 |
| 4,115,335 | 9/1978 | Reusser et al. | 524/71 |
| 4,145,322 | 3/1979 | Maldonado et al. | 524/68 |
| 4,172,061 | 10/1979 | Bresson | 524/68 |
| 4,196,115 | 4/1980 | Bresson | 524/68 |
| 4,217,259 | 8/1980 | Bresson | 524/68 |
| 4,220,500 | 9/1980 | Baba et al. | 162/127 |
| 4,233,356 | 11/1980 | Jacobs | 428/244 |
| 4,258,098 | 3/1981 | Bondoc et al. | 162/156 |
| 4,282,127 | 8/1981 | Desgouilles | 524/68 |
| 4,342,804 | 8/1982 | Meynard | 428/149 |
| 4,357,377 | 11/1982 | Yamamoto et al. | 428/291 |
| 4,361,672 | 11/1982 | Agarwal | 524/71 |
| 4,366,284 | 12/1982 | Ishido et al. | 524/519 |
| 4,368,228 | 1/1983 | Gorgati | 428/283 |
| 4,374,687 | 2/1983 | Yamamoto | 156/71 |
| 4,381,357 | 4/1983 | Wettern et al. | 524/71 |
| 4,456,705 | 6/1984 | McCarty | 428/355 |
| 4,459,157 | 7/1984 | Koons | 524/62 |
| 4,468,430 | 8/1984 | Ruede | 428/143 |

FOREIGN PATENT DOCUMENTS

| | | |
|---|---|---|
| 0038994 | 10/1980 | Japan .................. 524/71 |
| 1440011 | 6/1976 | United Kingdom . |
| 2111860 | 7/1983 | United Kingdom . |

OTHER PUBLICATIONS

Derwent Abstract 05652j/49, J57176266 (10-82).
Derwent Abstract 14368c/08, SU667572 (6-79).
Derwent Abstract 80415d/44 (9-81) J56117648.
Derwent Abstract 20971c/12 (2-80) J55017558.
Derwent Abstract 78828y/44, J77040500 (10-77).
Derwent Abstract 74574e/36, BE-893036 (8-82).

*Primary Examiner*—Herbert J. Lilling
*Attorney, Agent, or Firm*—Brumbaugh, Graves, Donohue & Raymond

[57] ABSTRACT

An all-weather inorganic fiber mat based roofing shingle is prepared using a novel bituminous coating formulation comprising a partially air blown asphalt combined with a styrenic elastomer and mineral stabilizer, which formulation more particularly comprises about 3 to 80% elastomeric polymer composition, 10 to 87% bituminous composition and 10 to 87% mineral stabilizer. In another embodiment, improved low and high temperature pliability and strength properties are also attained by blending recycled rubber or reclaimed rubber into the basic formulation which thereby comprises about 1 to 74% elastomeric polymer composition, 10 to 83% bituminous composition, 15 to 88% mineral stabilizer and about 1 to 74% recycled or reclaimed rubber.

10 Claims, No Drawings

COATING FORMULATION FOR INORGANIC FIBER MAT BASED BITUMINOUS ROOFING SHINGLES

This application is a division of application Ser. No. 520,844, filed on Aug. 5, 1983, now abandoned.

BACKGROUND OF THE INVENTION

The present invention relates to roofing material such as roofing shingles, or the like. More particularly, this invention relates to a new and improved bituminous coating formulation useful in making a roofing mat or sheet material which possesses improved physical properties particularly suitable for application and use in low temperature climates.

Roofing materials are generally composed of a support layer or substrate, traditionally a felted, fibrous layer, which is saturated with a waterproofing agent, such as a bituminous or asphalt composition. The felt material is impregnated with the asphalt composition, generally a blown petroleum derivative with excess saturant asphalt removed by scraping. Subsequently, the asphalt saturated felt is coated with a bituminous coating containing finely ground mineral stabilizer. While the filled coating bitumen is still in a plastic state, granular material normally opaque to ultraviolet light is pressed onto the weather exposed face to protect the bitumen from the ultraviolet rays or actinic effects of the sun, as well as to form a decorative coating. The bitumen coating would otherwise deteriorate producing cracking or crazing, thus permitting leaking on the roof in due time. The granules which have been most widely used are formed from rock, such as crushed slate and trap rock.

The waterproofing character of the asphalt is the main attribute of the final product and the felt serves in a secondary status as a carrier, substrate and preserver of the asphalt.

The fibrous felt material used for many years was commonly some organic fiber, such as rag, wood, paper, or jute fibers. Roofing materials based on organic felts tend, at least to a certain degree, either to absorb or release moisture under varying climatic conditions. The resulting fluctuations in moisture content cause the felt to expand and contract, which can result in the occurrence of blisters due to steam occlusions. Organic fibers used in making suitable felt materials also tend to decay somewhat rapidly under variations in weather conditions and have drawbacks for other reasons such as heat and hydro-dimensional instability which lead to distortions in the applied finished product.

In view of these drawbacks, it has been desirable to use inorganic fibers, and particularly glass fiber materials, in preparing roofing felts. Due to its excellent heat and hydro-dimensional stability, which is generally recognized as a most important characteristic in preparing roofing materials, glass fiber has found application in various uses as an industrial substrate material. The desirability of a glass fiber based felt is due to the peculiar characteristics of the glass fiber. These fibers are inorganic, and therefore, are fire-resistant, have low thermal expansion and contraction, and are insensitive to relative humidity changes and moisture absorption.

The extremely high porosity and inactive surface characteristics of conventional glass fiber mat cause many problems in practical use. When glass fiber is used as a substrate for making a structural material, such as roofing shingle mat, a binder is necessary to hold the glass fibers together. The binder material is impregnated directly into the fibrous mat and set or cured to provide the desirable integrity for the glass fibers. Attempts have been made to produce glass fiber mat having improved tensile strength and flexibility by the addition of certain bituminous, elastomer and thermoplastic ingredients to the binder material. Unfortunately, the bituminous binder materials of the prior art are deficient in one or more respects for glass fiber mats. In particular, such binder materials provide glass mats which exhibit only acceptable tensile strengths at room temperature or at elevated temperatures. Furthermore, the tensile strengths of such mats can deteriorate appreciably when the mats are subjected to wet or cold conditions, which can be encountered in their use in roofing as well as in flooring products. In addition, these prior art mats have relatively poor flexibility, resulting in buckling, creasing or cracking of the mats during use, handling or application as a base in asphalt roofing shingles or as a backing felt or base support for sheet vinyl flooring.

In particular, glass fiber mat based shingles coated or impregnated with a bituminous material have serious application and handling problems, particularly when installed at or below a field ambient temperature of 40° F. (4.5° C.). Moreover, the inherent brittleness of most inorganic or glass fiber mat materials, which is less of a problem in milder climates, makes the product totally unsuitable in colder climates.

Known bituminous coating or binder materials suitable for most roof service conditions have a glass transition point of approximately 32° F. (0° Centigrade). Commonly the bituminous materials are filled with an inorganic mineral stabilizer to improve their fire resistance, high temperature flow and weather resistance. These filled bituminous coatings, however, have a distinct tendency to shatter and break during normal application or handling or during maintenance traffic on the roof shingle surface, particularly at cold temperatures.

Accordingly, it is an object of the present invention to provide an inorganic roofing felt, and particularly a glass fiber mat based bituminous roofing felt, having improved flexibility, strength, durability and weatherability.

It is another object of this invention to provide an all weather glass mat based bituminous roofing shingle having acceptable physical properties, including flexibility and tensile strength, at both high and low temperature extremes.

It is a further object of this invention to provide a glass fiber mat based roofing material which possesses sealing characteristics capable of withstanding the stresses imposed by an outdoor environment, particularly the mechanical stresses due to the motion of the surface on which it is applied, natural atmospheric stresses due to low or high temperature, sun and the like, and artificial stresses, such as chemical and physical attacks.

SUMMARY OF THE INVENTION

It has now been found that an all weather inorganic fiber mat based roofing shingle can be prepared using a novel bituminous coating formulation comprising a partially airblown asphalt combined with a styrenic elastomer and mineral stabilizer. The bituminous roofing shingle materials which may be produced using the coating formulation according to the invention possess excellent physical prooerti.es, including flexibility and tensile strength, particularly at lower temperatures.

By judicious selection of the asphalt, polymer, stabilizer and relative amounts of each component for the coating formulations, desirable end product physical properties at both high and low temperature extremes may be obtained. More particularly, the coating formulation comprises (a) about 3% to 90%, preferably about 3.5% to 10%, of an elastomeric polymer composition, more specifically a styrenic elastomer, such as Philips Solprene 475S, or Shell Kraton 1101 SBS block copolymers;

(b) about 10% to 97%, preferably about 35% to 40%, of a bituminous composition, such as saturant asphalt containing, optionally, aromatic process oils; and (c) about 15% to 85%, preferably about 25% to 60%, of a mineral stabilizer, such as trap rock dust stabilizer.

The most preferred composition comprises about 3.2% by weight of a styrenic elastomer, such as Philips Solprene 475S or Shell Kraton 1101 block copolymers, about 39.3% saturant asphalt, and about 57.5% trap rock dust stabilizer.

In another embodiment, the low and high temperature pliability and strength properties of a filled bituminous coating can be significantly improved by the synergistic effect developed by blending "recycled rubber" or "reclaimed rubber" and either thermoplastic SBS elastomers or "off-spec" SBS elastomers into partially air-blown asphalts. According to this embodiment, a suitable coating formulation comprises (a) about 1% to 90%, preferably about 2% to 10%, of an elastomeric polymer composition, preferably styrenic elastomer, such as an SBS thermoplastic elastomer;

(b) about 10% to 97%, preferably about 30% to 40%, of a bituminous composition, such as saturant asphalt and aromatic process oils;

(c) about 15% to 85%, preferably about 25% to 60%, of a mineral stabilizer, such as a trap rock dust stabilizer; and (d) about 1% to 90%, preferably about 2% to 10%, of a recycled or reclaimed rubber.

The most preferred coating formulation according to this embodiment comprises:

(i) about 2.1% by weight recycled rubber;
(ii) about 3.2% by weight styrenic elastomer, such as Shell Kraton 1101 block copolymer;
(iii) about 37.2% by weight saturant asphalt; and
(iv) about 57.5% by weight trap rock dust stabilizer.

The coating formulations according to the invention may be applied by any conventional means for the manufacture of non-woven mat products using any suitable fiber material, including inorganic fiber materials such as glass, glass wool, rock wool, mineral wool and the like. Depending upon the level of polymer modification selected, non-woven mat products prepared according to the invention can be stored as well as applied at temperatures as low as 0° F. (−14° C.).

Reclaimed or recycled rubbers are more cost effective than polymer modifiers and also improve asphalt durability and UV resistance due to their high carbon black and sulfur levels. Reclaimed rubber is the product resulting from the treatment of ground vulcanized scrap rubber tires, tubes and miscellaneous waste rubber articles by the application of heat and selected chemical agents, followed by intense mechanical working, whereby a substantial devulcanization or regeneration of the rubber component to its original plastic state is effected. Reclaiming is essentially depolymerization, thus permitting the product to be compounded, processed and revulcanized. During reclaiming the combined sulfur and carbon black are not removed.

Recycled rubber is the product resulting from the grinding of vulcanized scrap rubber tires, tubes, etc. The use of time, heat, chemical agents and intense mechanical stressing are not employed to devulcanize the rubber. However, partial devulcanization can take place during the blending of the recycled rubber into hot asphalt in the roofing plant at selected high temperatures, time periods and mechanical working stresses developed during mixing and coating operations.

In the context of the present invention, the bituminous component may be selected from any bituminous asphalt composition, including both "straight run" bitumens, which comprise the residual portion remaining after atmospheric or vacuum distillation of the petroleum, and oxidized bitumens obtained by blowing air through molten asphalt at elevated temperatures.

The coating compositions according to the invention exhibit the following advantageous properties:

A. Foldability in the cold, i.e. no cracks at temperatures as low as −30° Centigrade;

B. Ring and Ball softening point at 210°–240° F.;

C. Elongation at break of about 3% to 100% at 0° C.;

D. Thermal behavior: after 5 hours at 190° Centigrade (374° F.), the softening point and foldability in the cold are unchanged;

E. Impact improvement to resist breakage due to handling at low temperatures and to resist cracking and embrittlement upon nailing application at low temperatures; and F. Toughness and tear resistance of the coating so as to resist wind blow-off.

DETAILED DESCRIPTION OF THE INVENTION

In the following detailed description of the invention, a conventional wet lay process is used to prepare a glass fiber mat based roofing shingle. It will be understood that other processes known in the art, such as a dry lay process, may be used as well. Furthermore, the description is made using chopped bundles of glass fibers, although other forms of glass fiber, such as continuous strands, as well as other inorganic fibers, may be used. The glass fiber used in the present invention is the conventional material used in producing glass fiber sheet. Glass fibers are usually used in an amount of 80% by weight or more, preferably 72 to 82 weight percent, based on the total amount of fibers used in the substrate.

The glass fiber mat is formed by conventional wet lay process techniques using chopped bundles of glass fibers of suitable length and diameter. Generally, fibers having a length of about ¼ inch to 3 inches and a diameter of about 10 to 20 microns are used. The bundles are added to an aqueous dispersant medium to form an aqueous slurry. Any suitable dispersant known in the art may be used. The fibrous slurry is then agitated to form a workable dispersion at a suitable consistency and is thereafter passed to a mat forming machine. En route to the forming screen, the dispersion is usually diluted with water to a lower fiber concentration.

The fibers are collected at the wire screen in the form of a wet fiber mat and the excess water is removed by vacuum in the usual manner. The uncured binder is applied by flooding then vacuuming to the appropriate level. The binder is cured so as to impart physical integrity to the finished composite mat. The mat is then dried and the binder composition is cured in an oven at elevated temperatures, generally at least about 350° F.

In preparing a roofing shingle using the bitumen/polymer composition according to the invention and a glass mat based substrate, crushed trap rock is added to the bitumen/polymer mixture and the shingle is prepared as follows:

Filled coating is placed on the moving mat by gravity across the top surface of the moving mat. The filled coating is metered and uniformly spread across the moving mat usually by a floating knife or knife over roll coating arrangement. Back surface coating is metered by a doctor blade/roll arrangement. Mineral surfacings are applied by gravity and uniformly pressed into the coating so as to fix the mineral surfacing to the filled asphalt.

The coating composition according to the invention is basically a bituminous composition containing polymer used as a sealant. By bitumen or bituminous as used herein, we refer to asphalt, commonly used in roofing manufacture, for example defined by softening point 90°–240° F., penetration 77° F./100 grm./5 sec. 10–250 dmm. The coating asphalt shall be selected such that when compounded with rubber(s), filled with mineral dust, and used in the manufacture of shingles, the coating will not slip or slide from the shingle at service temperatures. Additionally, the asphalt shall contain sufficient solubilizing oils to prevent gross phase separation of the uniformly dispersed rubber. Bitumen is generally well known for its sealing characteristics and has long been used in the manufacture of materials for sealing roofs and sidings of buildings, as well as for sealing of pavements. Bitumen is thermoplastic and normally applied as a coating in the molten state. It is also in the molten state when combined by coating with reinforcing supports, such as felt board, glass fibers, synthetic fibers and the like reinforcing supports. It may alternatively be applied in the form of a cutback solution or an emulsion.

The invention may be further understood by reference to the following examples, which are provided to illustrate the invention and should not be construed to limit the many variations and substitutions which may be made within the scope of the claims.

EXAMPLE 1

Preparation of Preferred Coating Formulation

A suitable coating formulation is prepared as follows:
1. An 800 gallon direct-fire heated mixing tank was charged with 130° F. softening Point, 62 dmm penetration (77/100/5) asphalt (approximately 3200 lb).
2. Philips Solprene 475S was then added by pouring the solid polymer granules into the top of the mixer.
3. Agitation of the asphalt/polymer mix was accomplished by counter rotating vanes attached to the central spindle of the mixer.
4. The heating burner was manually adjusted to maintain mix temperature between 370° F. and 410° F.
5. Mixing was continued for 45 minutes in the above temperature range.
6. The material was inspected for completeness of mixing by cooling, stretching and visual examination for undissolved rubber particles.
7. The mineral stabilizer was then added, with continued mixing, at such a rate as not to cool the polymer/asphalt blend below 360° F.
8. The coating was mixed for an additional minutes to maintain temperature while adding ambient temperature filler and to ensure complete mixing.
9. Coating maintained above 360° F. was then used as usual in the manufacturing operation.

EXAMPLE 2

Preparation of Preferred Coating Formulation Using Recycled or Reclaimed Rubber

A similar roofing plant manufacturing method as described in Example 1 is also used to prepare the preferred coating formulation using either recycled or reclaimed rubber.

No special, costly or additional equipment is required in the manufacturing plant. The recycled or reclaimed rubber can be added in steps 2 or 7 of Example 1 using the same blending temperatures and conditions.

EXAMPLE 3

Manufacture of Roofing Shingle

Shingles manufactured using the modified coatings were prepared by a conventional method as previously described. The coating was discharged by gravity from the mixers, spread across the moving glass mat web and metered. Surfacing application, cooling, cutting and packaging were accomplished in the usual manner.

EXAMPLE 4

Physical Testing

Five samples of the roofing shingle material prepared in accordance with Example 3 placed into a climate test chamber, controlled to a temperature of 40° F. and at the end of the 24+ hours period, and also at the end of a 48+ hours period, sample shingles were manipulated by several independent observers and compared, subjectively, for flexibility, stiffness, brittleness, and tearing propensity with that obtained on shingles manufactured using the standard construction on glass mat. All of the observers detected a vast improvement in each of the characteristics over the standard glass mat based shingle.

Segments of the above conditioned materials were subjected to a standardized cold temperature flexural bend test. The experimental material out performed the standard glass mat shingle by a factor of two.

Test decks were constructed and conditioned at 40° F. These decks were placed in a "wind tunnel" and tested for at 40° F. under an air stream with a velocity up to 60 miles per hour. The standard glass mat bituminous shingles failed by loss of tabs, while the invention product remained intact.

EXAMPLE 5

Long-Term Weatherability Tests

About 250 samples of the roofing shingle material prepared in accordance with Example 3 were tested for longterm weatherability as follows:

Standardized roofing test deck panels were constructed and placed in a controlled exposure area (Weathering Farm) at a 45° angle facing south, south west in the Houston, Tex. area. These materials are in excellent condition after almost two years exposure.

Standardized shingle roofing test deck panels were constructed and placed on exposure in an industralized north east, U.S.A. urban area. These shingles are in a good condition compared to control shingles.

An experimental production trial run of the subject material was shipped to St. Paul, Minn. and stored in an unheated warehouse. When thoroughly cold (exterior temperatures were from −30° F. to 20° F.), the shingles were applied to a building's roof by a commercial roofing applicator. The temperature at time of application was about 5° F. The experimental shingles were applied with no problems and were vastly superior, in application performance, to standard glass mat based bituminous shingles.

While the invention has been described with reference to certain embodiments thereof, it will be understood by those skilled in the art that other obvious embodiments as well as certain changes and modifications within the scope of the teachings of this specification are contemplated. Accordingly, the invention shall be limited only by the proper scope of the appended claims.

We claim:

1. A roofing shingle, comprising a substrate and a coating formulation applied thereto, wherein said substrate is an inorganic fiber mat and said coating formulation comprises:
   (a) about 1% to 74% of an elastomeric polymer composition, said polymer being block polymerized;
   (b) about 10% to 83% of a bitumen composition;
   (c) about 15% to 88% of a mineral stabilizer; and
   (d) about 1% to 74% of a recycled or reclaimed rubber.

2. A roofing shingle according to claim 1, wherein the inorganic fiber mat is a glass fiber mat.

3. A roofing shingle according to claim 1, wherein said coating formulation comprises:
   (a) about 2% to 10% of an elastomeric polymer composition:
   (b) about 30% to 40% of a bitumen composition;
   (c) about 25% to 60% of a mineral stabilizer; and
   (d) about 2% to 10% of a recycled or reclaimed rubber.

4. A roofing shingle according to claim 3, wherein the elastomeric polymer composition is a styrenic elastomer.

5. A roofing shingle according to claim 3, wherein the bitumen composition is saturant asphalt or aromatic process oils.

6. A roofing shingle according to claim 3, wherein the mineral stabilizer is trap rock.

7. A roofing shingle according to claim 3, wherein said coating formulation comprises about 2.1% recycled rubber, about 3.2% styrenic elastomer, about 37.2% saturant asphalt and about 57.5% trap rock dust stabilizer.

8. A method of forming a roofing shingle, comprising the steps of:
   providing a substrate of an inorganic fiber mat; and
   applying a coating formulation to said substrate comprising:
   (a) about 1% to 74% of an elastomeric polymer composition, said polymer being block polymerized;
   (b) about 10% to 83% of a bitumen composition;
   (c) about 15% to 88% of a mineral stabilizer; and
   (d) about 1% to 74% of a recycled or reclaimed rubber.

9. A method as defined in claim 8, wherein said coating formulation comprises:
   (a) about 2% to 10% of an elastomeric polymer composition;
   (b) about 30% to 40% of a bitumen composition;
   (c) about 25% to 60% of a mineral stabilizer; and
   (d) about 2% to 10% of a recycled or reclaimed rubber.

10. A roofing shingle according to claim 9, wherein said coating formulation comprises about 2.1% recycled rubber, about 3.2% styrenic elatomer, about 37.2% saturant asphalt, and about 57.5% trap rock dust stabilizer.

* * * * *

UNITED STATES PATENT AND TRADEMARK OFFICE
CERTIFICATE OF CORRECTION

PATENT NO. : 4,588,634

DATED : May 13, 1986

INVENTOR(S) : Pagen et al.

It is certified that error appears in the above-identified patent and that said Letters Patent is hereby corrected as shown below:

Col. 3, line 1, "prooert.es" should read --properties--;

Col. 5, line 48, "Coatinq" should read --Coating--;

Col. 6, line 1, before "minutes" insert --45--;

line 50, after "for" insert --15 minutes--; and line 57, "roofinq" should read --roofing--.

Signed and Sealed this

Ninth Day of September 1986

[SEAL]

Attest:

DONALD J. QUIGG

Attesting Officer

Commissioner of Patents and Trademarks